Nov. 26, 1963        Z. R. S. RATAJSKI ETAL        3,112,464
HALL EFFECT TRANSLATING DEVICE
Filed Nov. 27, 1961

ZIEMOWIT R. S. RATAJSKI
DONALD R. SIMON
INVENTORS

BY *S. A. Giavratana*
*George B. Oujero*
ATTORNEYS

United States Patent Office 3,112,464
Patented Nov. 26, 1963

3,112,464
HALL EFFECT TRANSLATING DEVICE
Ziemowit R. S. Ratajski, Cedar Grove, and Donald R. Simon, Bloomingdale, N.J., assignors to General Precision Inc., Little Falls, N.J., a corporation of Delaware
Filed Nov. 27, 1961, Ser. No. 154,949
9 Claims. (Cl. 338—32)

This invention relates to instruments of the type which translate position into an electrical signal and more particularly to such an instrument making use of the Hall effect.

The most common type of instrument for translating position into an electrical signal is the potentiometer or voltage divider, which comprises a resistor engaged by a sliding brush contact. This type of instrument has a limited resolution, which is defined as the smallest amount of position change detectable by the instrument. The resolution of such a potentiometer is limited because the resistance between the sliding brush and the end terminals of the resistor does not change continuously when the brush is moved along the resistor, but actually changes in small increments. The size of these increments determines the resolution of the potentiometer. In addition to having limited resolution, the sliding brush potentiometer has the disadvantages of its brush being subject to wear and the resistance between the brush and the end terminals depending not only on the distributed resistance of the resistor but also upon the randomly varying contact resistance between the brush and the resistor.

The present invention overcomes the disadvantages of the above described potentiometer by eliminating the sliding brush contact. In the device of the present invention position is detected by means of the Hall effect on a semiconductor body. Because the device performs the same function as the above described potentiometer, it is called a brushless Hall effect potentiometer. In the instrument of the present invention, flux is applied to the semiconductor body from a rotor, which provides angular position to be translated into an electrical signal. In one embodiment of the invention, the flux supplying rotor is shaped in the form of a cam and, as the rotor is rotated through different angular positions, the air gap between the rotor and the semiconductor body varies, thus causing the flux density passing through the semiconductor body to vary with the angular position. In this manner the output voltage produced from the semiconductor crystal by means of the Hall effect is made to vary with the angular position of the rotor. In another embodiment of the invention the output signal is made to vary with the angular position of the flux providing rotor by means of the shape of the semiconductor body. In still another embodiment of the invention the dependence of the output signal on the angular position is obtained by shaping the rotor so that the area of the periphery of the rotor varies at different angular positions on the rotor. In each of these different types of brushless Hall effect potentiometers a high degree of resolution is obtained. A change in position of $10^{-8}$ cm. can be detected. This resolution amounts to detecting a change in angular positions of $1.6 \times 10^{-3}$ seconds in a device of a diameter equal to that of a size 11 potentiometer.

Accordingly, it is an object of the present invention to provide an improved device for translating position into an electrical signal.

Another object of this invention is to provide a device which translates position into an electrical signal with improved resolution.

A further object of this invention is to overcome the disadvantages of the sliding brush contact in potentiometers or voltage dividers.

A still further object of this invention is to provide a brushless Hall effect device which will perform the same position translating function as a potentiometer.

Further objects and advantages of the present invention will become readily apparent as the following detailed description of the invention unfolds and when taken in conjunction with the drawings, wherein.

Figure 2:
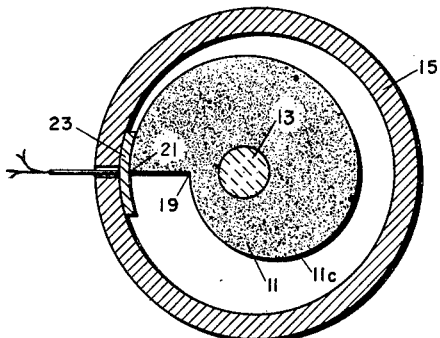
FIG. 2 shows a cross-sectional view of the device shown in FIG. 1.
Figure 1:
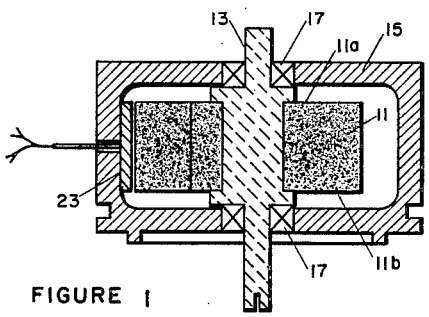
FIG. 1 shows a sectional view in elevation of one embodiment of the invention.

The embodiment of the invention shown in FIGS. 1 and 2 comprises a rotor 11 mounted on a shaft 13 which is rotatably mounted on the axis of a cylindrical casing 15 by means of bearings 17. The rotor 11 is bounded by parallel flat surfaces 11a and 11b perpendicular to the axis of the shaft 13 and a spiral peripheral surface 11c parallel to the axis of the shaft 13. The rotor 11 is shaped like a cam so that the radius of the spiral peripheral surface 11c gradually increases from the point 19 going counter-clockwise through 360°, as shown in FIG. 2, to the point 21, where the radius is the greatest. The points 19 and 21 are located at substantially the same angular position on the rotor 11 and there is an abrupt change in the radius of the peripheral surface 11c at this angular position. The inner radius of the cylindrical casing 15 is selected to be greater than the radius of the surface 11c at the point 21 so that there is a small gap between the surface 11c at the point 21 and the inner cylindrical wall of the casing 15. This gap is made large enough to accommodate a semiconductor crystal 23, which is mounted on the inner cylindrical wall of the casing 15 opposite the spiral peripheral surface 11c of the rotor 11, so that the rotor 11 may be rotated freely past the crystal 23. The rotor 11 comprises a permanent magnet which is polarized radially so that one pole is distributed over the spiral peripheral surface 11c of the rotor 11 and the other pole is positioned at the inner side of the rotor 11 where it is mounted on the shaft 13. The flux from the rotor 11 radiates radially from the surface 11c and passes through the semiconductor crystal 23. The distance between the semiconductor crystal 23 and the magnetic rotor 11 varies with the angular position of the rotor 11 and the shaft 13, and thus the flux density passing through the crystal 23 varies with this angular position. The crystal 23 is provided with input and output terminals so that when current is caused to flow through the crystal between the input terminals, a signal voltage will be caused to be produced from the output terminals by means of the Hall effect. A semiconductor body or crystal which is provided with input and output terminals to produce an output voltage by means of the Hall effect, such as the crystal 23, is defined as a Hall effect plate. Since the flux density applied to the crystal 23 varies with the angular position of the shaft 13 and the rotor 11, the signal voltage produced from the output terminals of the crystal 23 will vary with this angular position. In the preferred embodiment the radius of the rotor 11 varies linearly with the angular position on the rotor so that the amount of flux passing through the crystal 23 varies linearly with the angular position of the rotor 11 and shaft 13 and the output signal voltage produced by the crystal 23 varies linearly with this angular position. Thus there is provided a device for translating the angular position of the shaft 13 and the rotor 11 into an electrical signal.

Figure 4:
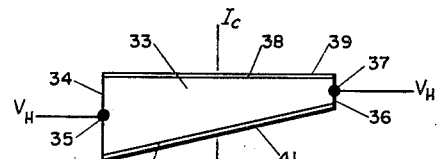
FIG. 4 is a developed view illustrating the shape of the semiconductor crystal of the device shown in FIG. 3.
Figure 3:
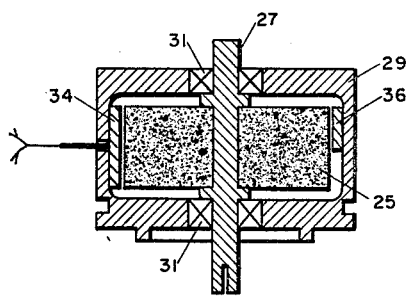
FIG. 3 shows a sectional view in elevation of another embodiment of the invention.

The embodiment of the invention shown in FIG. 3 comprises a cylindrical rotor 25 fixed concentrically on a shaft 27 rotatably mounted on the axis of a cylindrical casing 29 by means of bearings 31. Mounted in the space between the outer cylindrical wall of the rotor 25 and the inner cylindrical wall of the casing 29 is a semiconductor body 33 extending in a band around the shaft 27 through an arc of 359°. The width of the semiconductor body 33 in the direction parallel with the shaft 27 increases gradually from one end of the semiconductor body 33 to the other. The shape of the semiconductor body 33 is shown in FIG. 4, which is a view of the semiconductor body developed in a plane, or in other words unrolled. The semiconductor body 33 is bounded by an inner cylindrical surface, an outer cylindrical surface, two end surfaces designated 34 and 36, which are visible in FIG. 3, and two side surfaces. Input terminals 39 and 41 are provided on the end surfaces 38 and 40 respectively, and current is caused to flow through the semiconductor body 33 between the input terminals 39 and 41. The output terminals are 35 and 37 on side surfaces 34 and 36 between the end surfaces 38 and 40. The rotor 25 comprises a permanent magnet which is polarized to have its poles on its outer cylindrical surface on the opposite sides thereof. The flux from the magnet 25 will pass from whichever pole is adjacent to the semiconductor body 33 through the body 33 and cause a signal to be produced from the output terminals 35 and 37. The magnitude of the voltage produced from the terminals 35 and 37 will depend upon which part of the crystal 33 the pole of the magnet 25 is adjacent. Because the current density between the two side surfaces 38 and 40 varies, the output signal voltage produced across terminals 35 and 37 will vary as a pole on the rotor 25 rotates past the crystal 33 between the end surfaces 34 and 36, and the output signal voltage will be a function of the angular position of the rotor. When the north pole of the magnetic rotor 25 is adjacent the semiconductor body 33, a signal of the opposite polarity will be produced from the terminals 39 and 41 than when the south pole is adjacent the semiconductor body 33. In the preferred embodiment the width of the body 33 varies linearly with distance and angular position about the shaft 27 in order to produce an output signal voltage which varies linearly with the angular position of the magnetic rotor 25.

Figure 6:
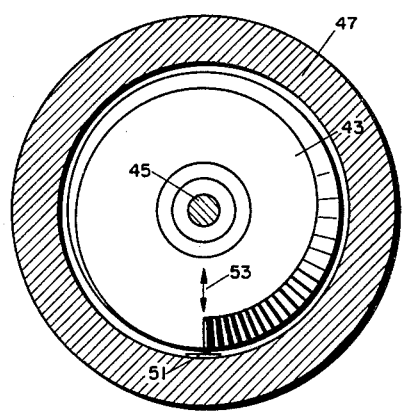
FIG. 6 is a cross-sectional view of the device shown in FIG. 5.
Figure 5:
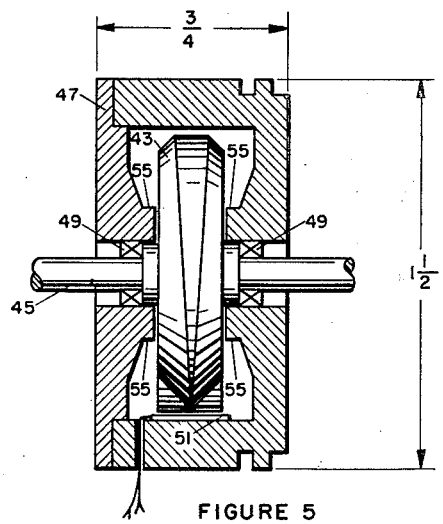
FIG. 5 is an elevational view in partial section of another embodiment of the invention.

In the embodiment shown in FIGS. 5 and 6, a rotor 43 is fixed concentrically on a shaft 45 mounted on the axis of a cylindrical casing 47 by means of bearings 49. A semiconductor crystal 51 is mounted between the rotor 43 and the inner cylindrical wall of the casing 47. The rotor 43 is formed with an outer peripheral surface, the width of which gradually increases from a point starting from the angular position designated 53 going counterclockwise, as shown in FIG. 6, through 360° back to the position 53. The variation in the width of the outer peripheral surface of the rotor 43 is achieved by bevelling off the corners of the otherwise cylindrically-shaped rotor between the cylindrical outer surface of the rotor and the plane end surfaces of the rotor. The rotor 43 is a permanent magnet which is polarized radially so that one pole is positioned at the inner radial side of the rotor and the other pole is distributed over the outer peripheral surface of the rotor. The flux from the magnetic rotor 43 radiates through the crystal 51 to the cylindrical casing 47, which is made of low reluctance material to provide a return path for the magnetic flux. To this end the casing 47 is formed with pole members 55 adjacent the inner radial side of the magnetic rotor 43. The semiconductor crystal 51 is provided with a pair of input terminals between which current is caused to flow. The crystal 51 is also provided with output terminals positioned on the crystal 51 to produce a signal voltage by means of the Hall effect of the flux applied to the crystal 51 by the magnetic rotor 43. The amount of the flux applied to the crystal 51 by the rotor 43 will depend upon the angular position of the rotor 43 and the shaft 45, because the width of the outer peripheral surface of the rotor 43 adjacent to the crystal 51 will vary in accordance with the angular position of the rotor 43 and the shaft 45 and the outer peripheral surface of the rotor is the pole face of the magnet. An increase in the width of the pole face adjacent the crystal 51 means that more flux will pass through the crystal 51 and a greater output signal voltage will be produced from the crystal 51. Thus the output signal voltage produced from the crystal 51 will vary in accordance with the angular position of the shaft 45. Because the width of the outer peripheral surface of the rotor 43 varies linearly, the output signal voltage from the crystal 51 will vary linearly with the angular position of the shaft 45. However, the output signal voltage produced from the crystal 51 may be made to vary as any desired function of the input shaft position simply by varying the manner in which the width of the outer peripheral surface of the rotor 43 is varied.

Each of the above described embodiments of the invention comprises a translating device which will produce an output signal varying in accordance with the angular position of an input shaft. Because of the high resolution obtained, the above described devices will detect a much smaller change in angular position than is detectable by a potentiometer or a voltage divider of an equivalent size. For example, a device of the present invention of a diameter equivalent to a size 11 potentiometer will detect an angular change of $1.6 \times 10^{-3}$ seconds.

Many modifications may be made to the above described devices without departing from the spirit and scope of the invention.

What is claimed is:

1. A translating instrument comprising an arcuate band of semiconductor material having an inner cylindrical surface and an outer cylindrical surface, a pair of arcuate side surfaces and a pair of end surfaces, the width of said semiconductor body between said side surfaces varying, means to cause current to flow through said semiconductor band between said end surfaces, output terminals on said side surfaces, and a magnet rotatable with respect to said semiconductor band positioned to apply flux to a cylindrical surface thereof.

2. A translating instrument comprising an arcuate band of semiconductor material having an inner cylindrical surface, an outer cylindrical surface, a pair of arcuate side surfaces, and a pair of end surfaces, the width of said semiconductor body between said side surfaces varying linearly going from one end surface to the other, means to cause current to flow through said band of semiconductor material between said end surfaces, output terminals on said side surfaces, and a magnet rotatable with respect to said semiconductor band positioned to apply flux to a cylindrical surface thereof.

3. A translating instrument comprising a magnet having a pole distributed over a cylindrical surface, a Hall generator positioned facing said cylindrical surface in the path of the flux radiated therefrom, means to rotate said magnet relative to said Hall generator about the axis of said cylindrical surface, the width of said cylindrical surface varying linearly with the angular position of said magnet about the axis of said cylindrical surface.

4. A translating instrument comprising:
- a permanent magnet having at least one of its poles radially spaced from an axis through the magnet, said one pole constituting a peripheral surface of the magnet and being shaped to vary linearly with angular displacement about said axis the magnetic flux at a given constant radial distance from said axis;
- a Hall effect plate disposed adjacent the magnet with its major planar surface intersecting lines of flux emanating from said one pole; and
- means mounting said plate and magnet for relative angular displacement therebetween about said axis.

5. A translating instrument comprising:

a permanently magnetized body polarized to have lines of flux directed radially with respect to an axis passing through the body, one pole of the magnetized body being disposed adjacent said axis and the other being spaced radially outwardly therefrom, the face of said other pole constituting a peripheral surface of the body and being shaped to vary linearly with angular displacement about said axis the magnetic flux at a given constant radial distance from said axis;

a Hall effect plate disposed adjacent the magnetized body with its major planar surface intersecting the lines of flux emanating from said other pole; and means mounting said plate and body for relative angular displacement therebetween about said axis.

6. A translating instrument comprising:

a permanently magnetized body polarized to have lines of flux directed radially with respect to an axis passing through the body, one pole of the magnetized body being disposed adjacent said axis and the other being spaced radially outwardly therefrom, the face of said other pole constituting a peripheral surface of the body and being shaped to vary linearly with angular displacement about said axis the magnetic flux at a given constant radial distance from said axis;

a Hall effect plate fixedly mounted adjacent and with respect to said magnetized body and having a major planar surface, in confronting relation to the peripheral surface of the body, cylindrically curved about said axis; and means mounting said magnetized body for relative angular displacement about said axis.

7. A translating instrument according to claim 6 wherein said peripheral surface has the configuration of a spiral curve about said axis as its center, whereby the linear magnetic flux variation is achieved by variation of the radial distance between said peripheral surface and said Hall effect plate.

8. A translating instrument according to claim 6 wherein said peripheral surface includes a circular portion having said axis as its center and varying monotonically in its axial dimension whereby the linear magnetic flux variation is achieved by variation of the effective area of the pole face emanating flux intercepted by said Hall effect plate.

9. A translating instrument according to claim 4 wherein said permanent magnet has opposite poles at diametrically opposite points on said peripheral surface, with respect to and at equal radial distances from, said axis, said Hall effect plate being concentrically curved about said axis and having a monotonically varying dimension parallel to said axis.

References Cited in the file of this patent

UNITED STATES PATENTS

| | | |
|---|---|---|
| 2,536,805 | Hansen | Jan. 2, 1951 |
| 2,719,930 | Lehde | Oct. 4, 1955 |
| 2,924,633 | Sichling | Feb. 9, 1960 |
| 3,024,409 | Brown | Mar. 6, 1962 |
| 3,060,370 | Varterasian | Oct. 23, 1962 |

FOREIGN PATENTS

| | | |
|---|---|---|
| 348,027 | France | Mar. 29, 1905 |
| 231,889 | Australia | Feb. 26, 1959 |